(12) United States Patent
Jones et al.

(10) Patent No.: US 8,589,818 B1
(45) Date of Patent: Nov. 19, 2013

(54) MOVEABLE VIEWPORT FOR INDICATING OFF-SCREEN CONTENT

(71) Applicants: Jonah Jones, San Francisco, CA (US); Willem Van Lancker, New York, NY (US)

(72) Inventors: Jonah Jones, San Francisco, CA (US); Willem Van Lancker, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/733,402

(22) Filed: Jan. 3, 2013

(51) Int. Cl.
*G06F 3/048* (2013.01)

(52) U.S. Cl.
USPC .......................... 715/785; 715/781; 715/784

(58) Field of Classification Search
USPC ....................................................... 715/784
See application file for complete search history.

(56) References Cited

U.S. PATENT DOCUMENTS

| | | | |
|---|---|---|---|
| 7,359,798 B2 * | 4/2008 | Nagamasa | 701/455 |
| 8,014,943 B2 | 9/2011 | Jakobson | |
| 8,032,297 B2 * | 10/2011 | Jakobson | 701/426 |
| 8,350,849 B1 | 1/2013 | Jones et al. | |
| 2007/0050129 A1 | 3/2007 | Salmre | |
| 2008/0228386 A1 | 9/2008 | Geelen et al. | |
| 2009/0281719 A1 | 11/2009 | Jakobson | |

OTHER PUBLICATIONS

Baudisch et al., "Halo: A Technique for Visualizing Off-Screen Locations," Paper/Demos: Interaction Techniques for Constrained Displays (2003).
Gustafson et al., "Wedge: Clutter-Free Visualization of Off-Screen Locations," CHI 2008 Proceedings—Displayful and Displayless (2008).
U.S. Appl. No. 13/586,694, "Out-of-Viewpoint Indicators for Relevant Map Features," filed Aug. 15, 2012.

* cited by examiner

*Primary Examiner* — Boris Pesin
*Assistant Examiner* — Matthew Ell
(74) *Attorney, Agent, or Firm* — Marshall, Gerstein & Borun LLP

(57) ABSTRACT

An off-screen content indication system receives an identification of a geographic term, generates an off-screen content indicator that indicates a location of an off-screen entity associated with the identified geographic term, places the off-screen content indicator outside a viewport that currently displays a portion of a map to a user, and temporarily moves or shifts the viewport toward the general direction of the location of the off-screen entity to reveal the generated off-screen content indicator.

24 Claims, 6 Drawing Sheets

MOVEABLE VIEWPORT FOR INDICATING OFF-SCREEN CONTENT

FIELD OF DISCLOSURE

The present disclosure relates to digital map systems and more specifically to a device and method configured to provide an indication of off-screen content on a digital map during a geographic search via the temporary movement of a viewport.

BACKGROUND

Digital maps are displayed and are used in a wide variety of devices, including car navigation systems, hand-held GPS units, mobile phones, and many websites. Moreover, digital maps may contain a wealth of map information such as satellite images, roads, street photographs taken from the ground level, specific information for a business, etc. However, the physical size and display resolution limitations of many device display screens restrict the amount of map information that may be displayed to a user at one time. Moreover, a desired viewing resolution or viewing magnification of a displayed digital map may limit a user to viewing only a small portion of the map at one time. As a result, some map features and information may not be contained in the current viewing window or viewport of the map at a user-selected level of detail or magnification or with a particular resolution or a size of a display screen.

To cope with map information that is not contained within the viewport or with content that is "off-screen," existing map systems have placed overlays or indicators that indicate a direction pointing toward the off-screen content. These existing map systems have generally placed overlays at the edge of the viewport or next to a search box to suggest a general direction in which the off-screen content is located with respect to the displayed map content. Other current map systems have implemented radar-like or sonar-like "pings" that generate a series of ever-expanding circles that originate from the location of the off-screen content and subsequently appear on the displayed portion of the map to a user. In these map systems, a user can deduce, from the size and the arc of the expanding circle or ping, the direction of and approximate distance to the location of the off-screen content. However, these overlay indicators of existing map systems generally occlude or obstruct the displayed portion of the map and conceal map information that is positioned directly underneath a placed overlay indicator. Moreover, the overlay indicators may further clutter an already information-dense displayed portion of the map and may confuse the user in providing additional information.

SUMMARY

A computer-implemented method for providing an indication of off-screen content during a geographic search includes providing a digital map via a user interface in a map client device, displaying a portion of the digital map corresponding to a selected geographic area within a viewport located in a first position and receiving a geographic search term via the user interface as the geographic search term is being input, and determining that the geographic search term identifies an off-screen entity located outside the selected geographic area. The method then provides an off-screen content indicator that indicates the direction toward the identified off-screen entity, and temporarily moves the viewport in a general direction of the identified off-screen entity from the first position to a second position, the off-screen content indicator being visible only when the viewport is moved to the second position.

A computer-readable storage medium includes a set of instructions, executable by a processor, that provides an indication of off-screen content during a geographic search for a map client device having a user interface. The instructions include providing a digital map via the user interface, displaying a portion of the digital map corresponding to a selected geographic area within a viewport located in a first position, and receiving a geographic search term via the user interface as the geographic search term is being input. The instructions also include determining that the geographic search term identifies an off-screen entity located outside the selected geographic area, providing an off-screen content indicator that indicates the direction toward the location of the identified off-screen entity, and temporarily moving the viewport in a general direction of the location of the identified off-screen entity from the first position to a second position, wherein the off-screen content indicator is visible only when the viewport is moved to the second position.

An off-screen content indication system for providing an indication of an off-screen content during a geographic search includes a map display routine that is stored on one or more computer memories and that executes on one or more computer processors to provide a digital map via a user interface and to display a portion of the digital map corresponding to a selected geographical area within a viewport located in a first position. Moreover, the system includes a geographic search term input routine that is stored on one or more computer memories and that executes on one or more computer processors to receive a geographic search term via the user interface as the geographic search term is input. The system also includes an off-screen content indication routine that is stored on one or more computer memories and that executes on one or more computer processors to determine that the geographic search term identifies an off-screen entity located outside the selected geographic area, to provide an off-screen content indicator that indicates the direction toward the location of the identified off-screen entity, and to temporarily move the viewport in a general direction of the location of the identified off-screen entity from the first position to a second position, wherein the off-screen content indicator is visible only when the viewport is moved to the second position.

DETAILED DESCRIPTION

Generally speaking, an off-screen content indication system provides an indication of a direction toward a location of an off-screen entity without occluding any currently displayed map features to a user. In particular, a mapping module receives an identification of a suggested geographic term from the user, and the mapping module determines whether the location of the entity is off-screen such that it is outside a map that includes both a currently displayed, user-visible portion of the map and a non-visible buffer zone surrounding the displayed portion of the map. If the mapping module determines the location of the off-screen entity to be outside the map, the mapping module generates an off-screen content indicator that indicates the location of the off-screen entity associated with the identified geographic term and places the off-screen content indicator outside a viewport that currently displays a portion of a map to a user. The mapping module then temporarily moves or shifts the viewport toward the general direction of the location of the off-screen entity to reveal the generated off-screen content indicator and may shift back. In response to receiving an identification of an additional suggested geographic term from the user, the mapping module may repeat this process of temporarily moving or shifting the viewport to reveal another newly generated off-screen content indicator associated with the received identification of the additional suggested geographic term.

Figure 1:
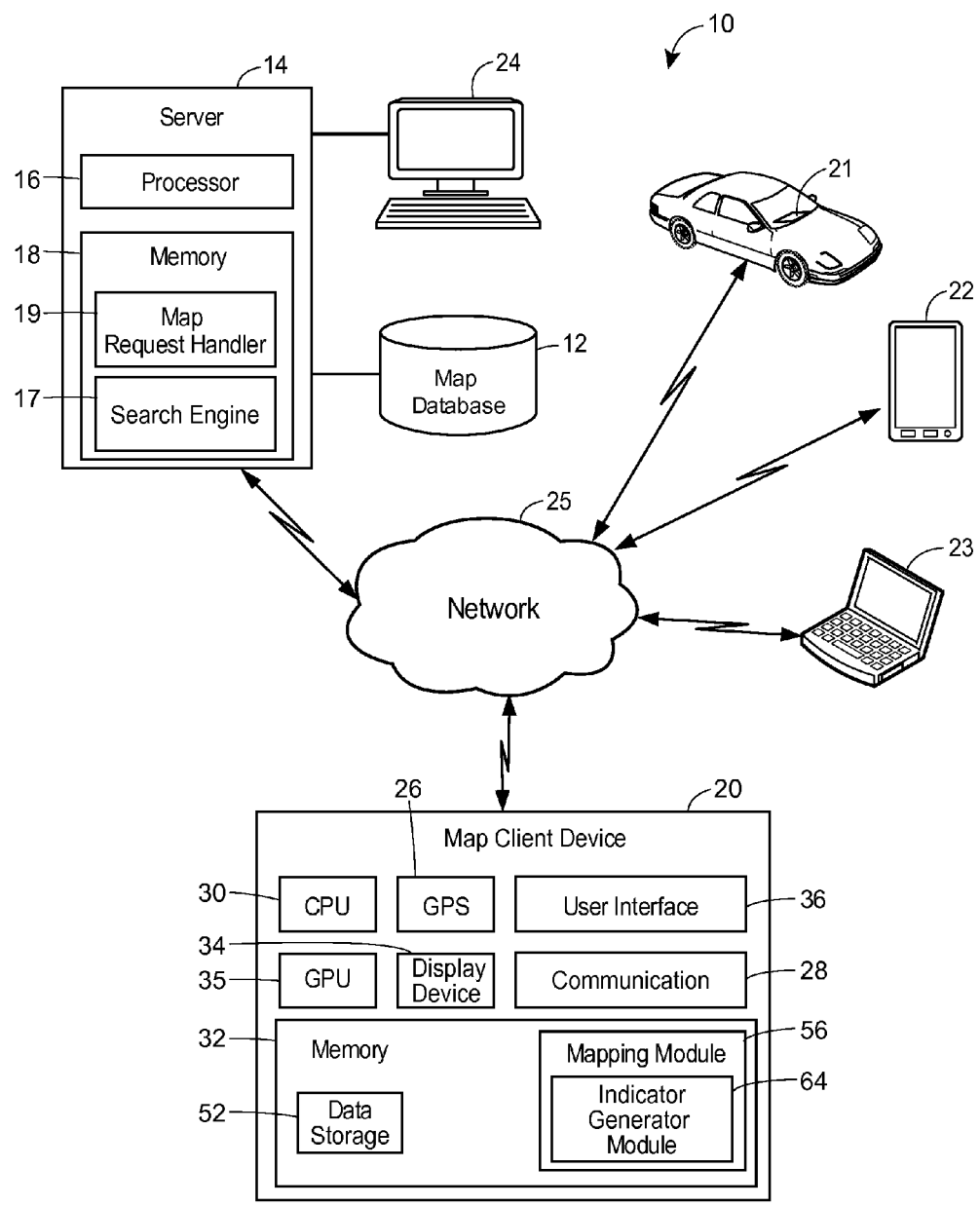
FIG. 1 is a high-level block diagram of a computing environment that implements communications between a map database stored in a server and one or more map client devices.

Referring now to FIG. 1, an off-screen content indication system 10 includes a map database 12 stored in or at or associated with a server 14 or multiple servers located at, for example, a central site or at various different spaced apart sites, and also includes multiple map client devices 20-24, each of which stores and implements a mapping module (discussed below) or a mapping engine. The server 14 additionally includes a processor 16 and a map request handler 19 stored in a memory 18 that manages and fulfills incoming map data requests from the map client devices 20-24. Moreover, the memory 18 includes a search engine 17 that may retrieve information associated with a geographical term or may suggest geographic terms based on user input. Of course, the search engine 17 may also be disposed in one or more of the map client devices 20-24. The map client devices 20-24 may be connected to the server 14 via any hardwired or wireless digital communication network 25, including for example a hardwired or wireless local area network (LAN), metropolitan area network (MAN) or wide area network (WAN), the Internet, or any combination thereof. The map client devices 20-24 may be, for example, mobile devices 22 (e.g. phones, smartphones, personal digital assistants (PDA), etc.), computers such as a laptop 23, tablet, desktop 24 or other suitable types of computers, or components of other imaging systems such components of automobile navigation systems 21, etc. Moreover, it is understood that the components shown in the map client device 20 are included in each of the other map client devices 21-24 as well as any other map client device described above, and the components of the map client device 20 are not to be limited to only the map client device 20. Each of the map client devices 20-24 may be communicatively connected to the server 14 via any suitable communication system, such as any publically available and/or privately owned communication network, including those that use hardwired based communication structure, such as telephone and cable hardware, and/or wireless communication structure, such as wireless communication networks, including for example, wireless LANs and WANs, satellite and cellular phone communication systems, etc.

The map database 12 may contain any type of map data, location information data (e.g., information about or stored for businesses or commercial entities, such as menus, hours of operations, website URLs, etc.), and application generated data as well as any other desired types of data. Generally, map data can be used to generate a digital map that may include roads, buildings, parks, or any other features appearing on a map. Physical roads may be represented in the map data by a list of nodes that represent geographical coordinate points (e.g. latitude and longitude) and road segments that connect those nodes. Other features, such as buildings and parks, similarly correspond to a specific geographical location in the physical world, and the data representation of each feature also includes a set of geographical coordinate points. Map data may be in the form of satellite image data, pictures, traditional road map data, etc. Map data may be generally updated by map developers or other computer systems. However, in many cases, map data, as well as location information data, building model data, application data, etc. may be updated by individuals or particular users in any desired manner. The map data stored in the map database 12 can be obtained from several different sources, such as the New York City Open Accessible Space Information System (OASIS) and the U.S. Census Bureau Topologically Integrated Geographic Encoding and Referencing system (TIGER) for example.

In any event, the map client device 20 (or any of the other map client devices 21-24) may include a display device 34, a communication unit 28, a user interface or user-input device 36, a Global Positioning System (GPS) unit 26 (e.g. for use in the mobile device 22 or any other suitable mobile map client device), a processor (CPU) 30, a graphics processing unit (GPU) 35, and a program memory 32. The program memory 32 includes a data storage 52, an operating system 50, and a mapping module 56 that stores a indicator generator module 64 that may be implemented to determine and to generate an off-screen content indicator. The operating system 50, for example, may include one of a plurality of mobile platforms for a mobile device such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively, or alternatively, may include a desktop operating system such as Windows, Mac OS, etc. (for the computer devices 23, 24). The data storage 52 may include data such as user profiles, map data for the mapping module 56 or the indicator generator module 64, and other data necessary to interact with the map database 12 or the server 14 through the digital network 25. The memory 32 may also include, or otherwise be communicatively connected to other data storage mechanisms (e.g., one or more hard disk drives, optical storage drives, solid state storage devices, etc.) that reside within the map client devices 20.

The GPS unit 26 may use "Assisted GPS" (A-GPS), satellite GPS, or any other suitable global positioning protocol or system that locates the position of the mobile device 18 (or any other map client device 20-24). For example, A-GPS utilizes terrestrial cell phone towers or wifi hotspots (e.g., wireless router points) to more accurately and more quickly determine location of the mobile device 18 while satellite GPS generally are more useful in more remote regions that lack cell towers or wifi hotspots. The communication unit 28 may communicate with the server 14 via any suitable wireless communication protocol network, such as a wireless telephony network (e.g., GSM, CDMA, LTE, etc.), a wi-fi network (802.11 standards), a WiMAX network, a Bluetooth network, etc. The user interface or user-input device 36 may include a "soft" keyboard that is displayed on the display device 34 of the map client device 20, an external hardware keyboard communicating via a wired or a wireless connection (e.g., a Bluetooth keyboard), an external mouse, or any other suitable user-input device. It should be appreciated that although FIG. 1 depicts only one processor 30, the map client device 20 may include multiple processors. Similarly, the memory 32 of the map client device 20 may include multiple program memories. The map client device 20 may implement the program memories 32 as semiconductor memories, magnetically readable memories, and/or optically readable memories, for example.

In any event, the one or more processors 30 may be adapted and configured to execute the mapping module 56 residing in the program memory 32, in addition to other software modules. The mapping module 56 may be implemented as a series of machine-readable instructions for performing the various tasks associated with receiving information at and displaying information on one of the map client devices 20-24, or alternatively, the mapping module 56 may be stored and executed in the memory 18 of the server 14 to perform the various tasks associated with transmitting information to one of the map client devices 20-24.

Generally speaking, the off-screen content indication system 10 operates such that a user, at one of the map client devices 20-24, executes the mapping module 56 that operates to communicate with and obtain map information or map related data from the map database 12 via the server 14, and that then displays or renders a map image based on the received map data. Additionally, the user may launch or instantiate any other suitable user interface application (e.g., a mobile application, a web browser, or any other software application) to access the server 14 to implement the off-screen content indication system 10. For example, the mapping module 56 may be implemented within or closely coordinated with a mobile application. In this example, in response to executing the mobile application with embedded mapping module 56, the user may interact with the mobile application to use the features and methods of the mapping module 56. Alternatively, the mapping module 56 may also cooperate or coordinate with a web browser, including, for example, a mobile web browser, a desktop web browser, etc. that may be implemented as a series of machine-readable instructions for receiving, interpreting, and displaying web page map information from the server 14 while also receiving inputs from the user and information from the mapping module 56.

In any event, the mapping module 56 may retrieve map data associated with the a user-specified geographic area that is stored in the map database 12 and store the retrieved map data in the data storage 52 of the memory 32 of the map client device 20 (or one of the map client devices 21-24). The mapping module 56 may render and display this stored map data on the display device 34 to allow the user to zoom in or out on the geographic area, to rotate, spin or change the two-dimensional or three-dimensional viewing angle of the map being displayed, etc. More particularly, when rendering a map image on a display device or a display screen 34, each of the client devices 20-24 may download map data in the form of vector data, raster data, or any other suitable type of map data from the map database 12 and processes that map data to render a digital map image on the associated display device 34.

Figure 2:
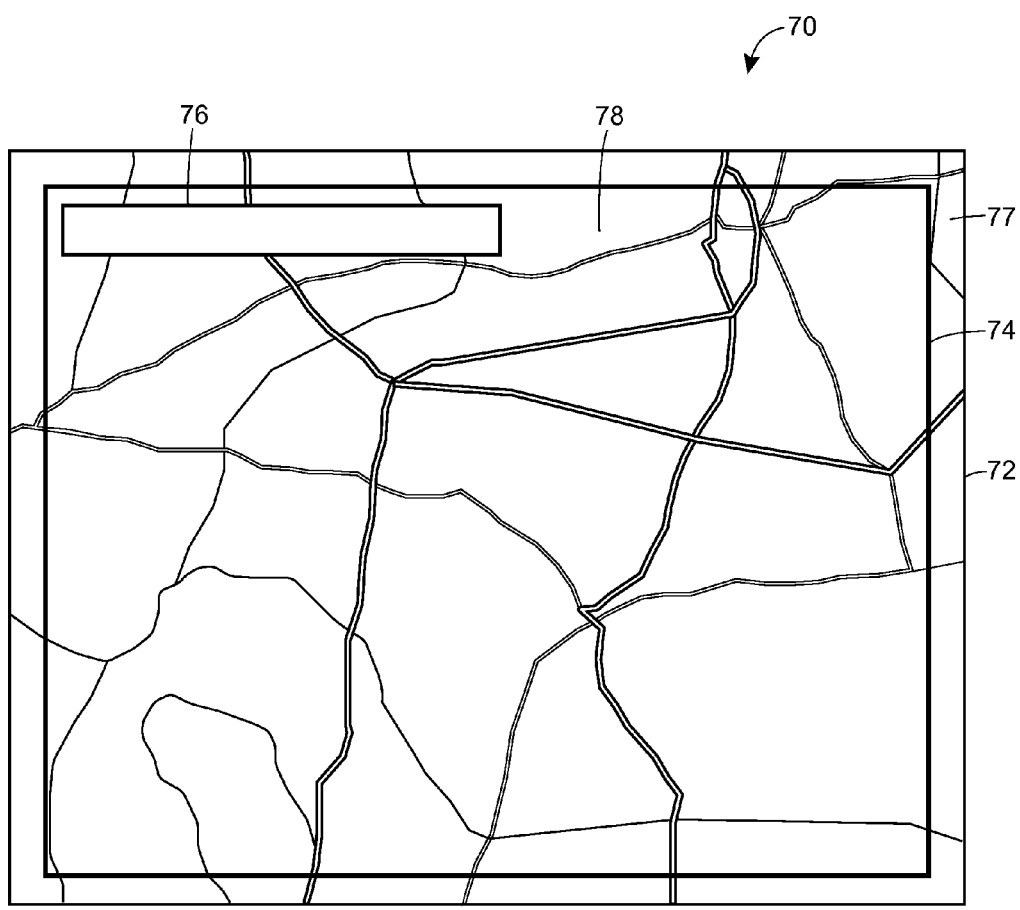
FIG. 2 illustrates an example digital map generated by a mapping module that contains both a user-visible portion of the map displayed within a viewport and a non-visible portion of the map situated outside the viewport that is not displayed to the user.

With reference to FIG. 2, an exemplary digital map 70 produced by the mapping module 56 is displayed to the user on the display device 34 of one of the map client device 20 (or one of the map client devices 21-24). The digital map 70 may include a primary map portion 78 that is displayed within a viewport 74 and is visible to the user. The mapping module 56 may render and display on the display device 34 the primary map portion 78 from map data that is stored in the data storage 52 of the map client device 20. Moreover, a peripheral map portion or a buffer zone 77 may reside outside the viewport 74 and is not visible to the user despite being a portion of the map 70. In response to a request to move the viewport 74 (described below), the mapping module 56 may render and display map data associated with the buffer zone 77 from the data storage 52 of the map client device 20. An outer boundary 72 of the map 70 may confine the movement of the viewport 74 to the area of the map 70 (described in more detail below). A search box 76 may allow the user to input a geographic search term via the user interface 36. Preferably, the search box 76 may appear affixed to the map 70 and may not move relative to the map 70 when the viewport 74 is repositioned relative to the map 70.

Figure 3:
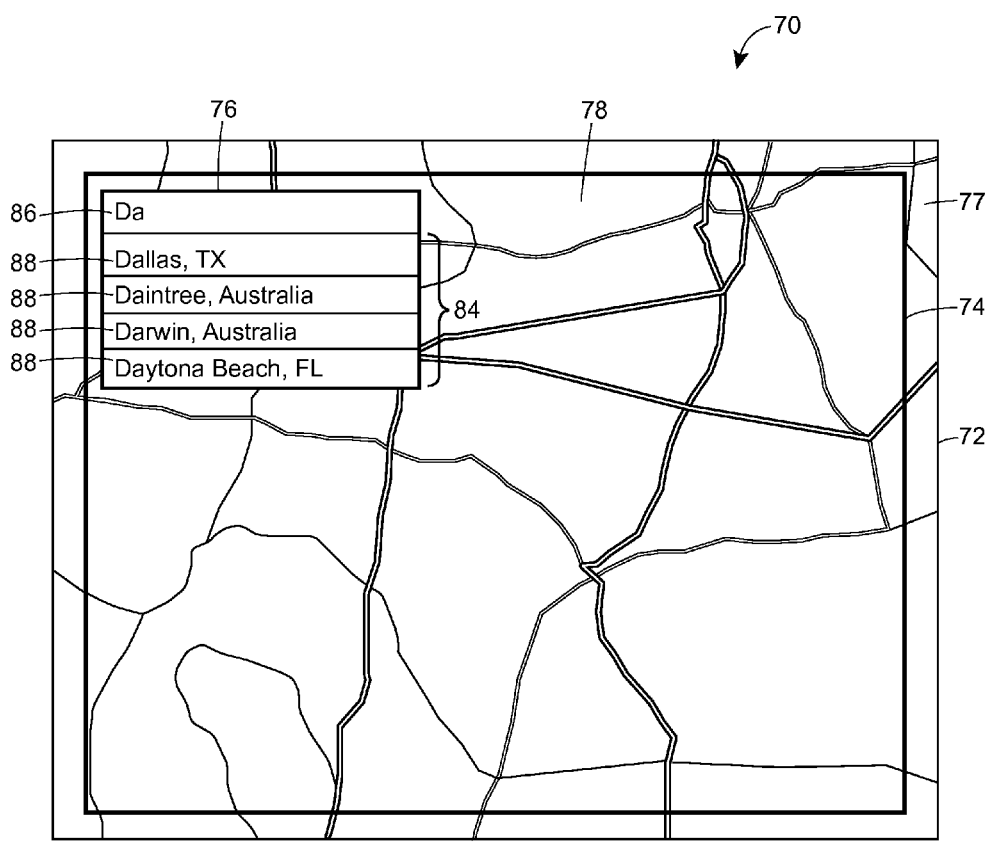
FIG. 3 illustrates an example digital map generated by a mapping module that includes a viewport in a first position relative to the map and a search box that includes a partially entered geographical search term with an associated drop-down field that includes suggested geographical search terms.

In any event, referring now to FIG. 3, the user may begin to enter a geographic search term 86 into the search box 76 via the user interface 36. For example, the user may begin typing or tapping letters corresponding to a portion of the geographic search term via the "soft" keyboard that is displayed on the display device 34 of the map client device 20. In response to receiving the geographic search term as it is being input from the user, the mapping module 56 may display within a dropdown field 84 one or more suggested geographic terms 88 that correspond to the entered portion of the geographic search term 86. As illustrated in FIG. 3, the user has entered the letters "Da" that correspond to the beginning portion of the geographic search term 86. In response to receiving the input "Da" in the search box 76 as shown in this example, the mapping module 56 displays, within the dropdown field 84, four suggested geographic terms 88 that correspond to the input "Da." Moreover, the mapping module 56 allows for the user to specify one of the suggested geographic terms 88 by highlighting or otherwise emphasizing one of the suggested geographic terms 88 without selecting the suggested geographic term 88.

Figure 4:
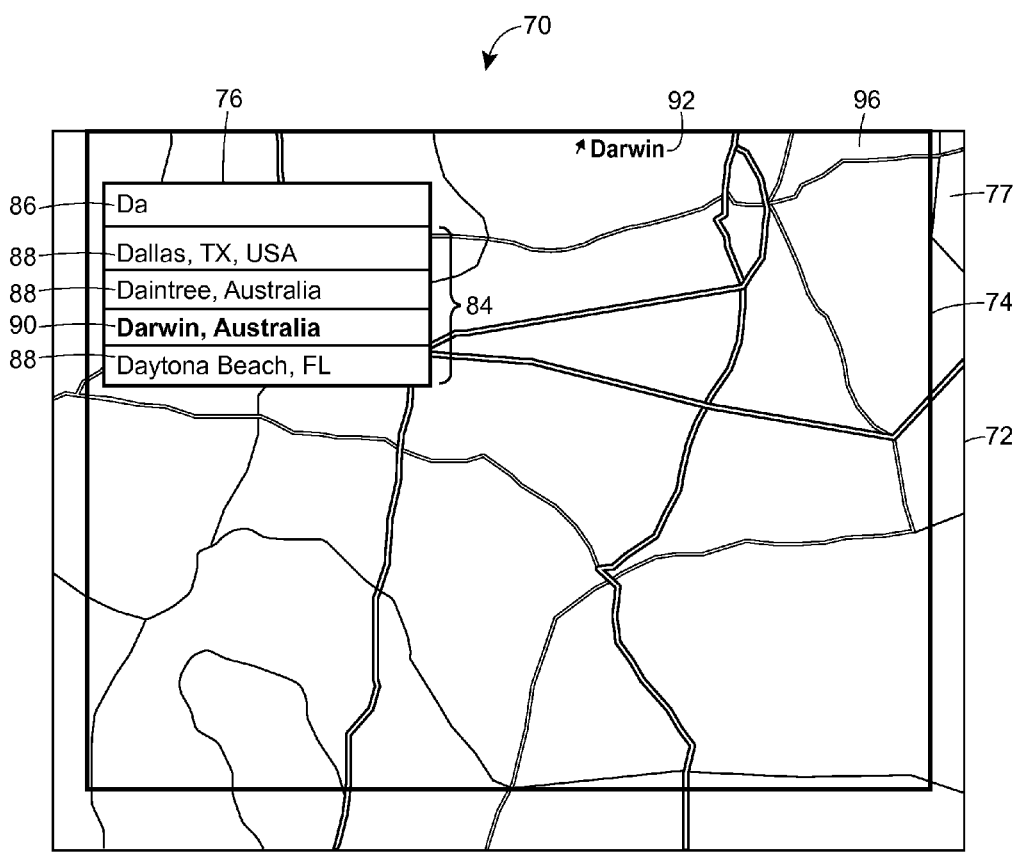
FIG. 4 illustrates an example digital map generated by a mapping module that includes a viewport in a second position relative to the map that is moved to reveal a first off-screen content indicator.

For example, as illustrated in FIG. 4, the user may identify one of the suggested geographic terms 88 that correspond to the user-entered input "Da" by hovering a cursor (not shown) over one of the suggested geographic terms 88, by selecting and holding one of the suggested geographic terms 88 via a touch screen (not shown), or by any other suitable manner of identifying one of the suggested geographic terms 88 without submitting the suggested geographic term 88 as a selection. In this example, the user has identified the highlighted suggested geographic term 90, "Darwin, Australia" via one of the previously described identification methods above. Upon receiving this identified suggested geographic term 90 from the user, the mapping module 56, in this example, determines a location of an entity (not shown) associated with the identified geographic term 90, and determines if the location of the entity is situated within the viewport 74. If the location of the entity is determined to be situated within the viewport 74, the mapping module 56 may directly display the location of the entity. However, if the location of the entity is determined to be located outside viewport 74 (i.e., off screen), the mapping module 56 may determine the precise location of the off-screen entity (e.g., geographic coordinates, etc.) and also may determine a general direction from the viewport 74 toward the geographic location of the off-screen entity.

Thereafter, the mapping module 56 may generate and may place an off-screen content indicator 92, for example, outside the displayed user-visible primary map portion 78 (i.e. the initial position of the viewport 74) of FIG. 3 and inside the outer boundary 72 of the map 70 (i.e. in the buffer zone 77. As shown in FIG. 4, the off-screen content indicator 92 may include the name or an abbreviated name of the identified geographic term 90 and an arrow that indicates the direction toward the location of the off-screen content. Of course, the off-screen content indicator 92 may instead include a user-selectable link or symbol that redirects the user to the location of the off-screen content (such as the location of Darwin), a distance to the location of the off-screen location, a direction compass that points toward the location of the off-screen content, page place data that includes information associated with the off-screen content, etc. In response to generating the off-screen content indicator 92, the mapping module 56 may temporarily shift or glide the viewport 74 from its initial position to a new position that reveals the generated off-screen content indicator 92 and then shift or glide the viewport 74 back to its initial position. In shifting the viewport 74, the mapping module 56 displays a different map portion 96 that preferably and substantially overlaps the initially displayed primary map portion 78 of FIG. 3. Preferably, both the map 70 and the search box 76 move relative to the viewport 74 when the viewport 74 shifts to the different map portion 96. This technique allows for the visual effect of the search box 76 appearing affixed the map 70 (from the point of view of the user) during a viewport 74 shift, and furthermore, the search box 76 does not occlude any newly revealed map features in the buffer zone 77. As a result, when the mapping module 56 shifts the viewport 74 to reveal the off-screen content indicator 92, the off-screen content indicator 92 advantageously does not occlude or obstruct any features appearing on the initially displayed user-visible primary map portion 78 as shown in FIG. 3.

Figure 5:
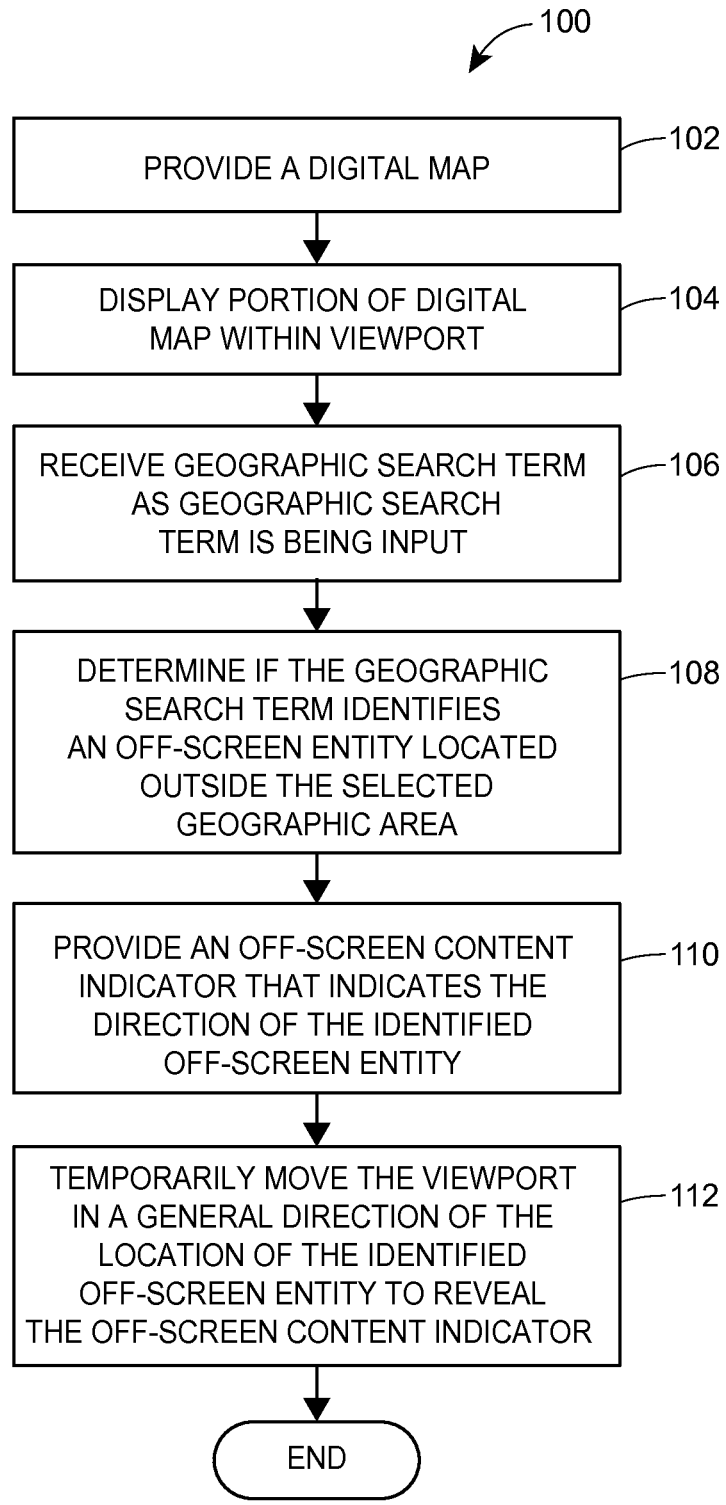
FIG. 5 illustrates an example digital map generated by a mapping module that includes a viewport in a third position relative to the map that is moved to reveal a second off-screen content indicator.

FIG. 5 depicts an exemplary method 100, implemented by the mapping module 56 of FIG. 1, for implementing the off-screen content indication system 100. After retrieving and providing a digital map that represents a geographic area (e.g. the map 70, etc.) at a block 102, the mapping module 56 displays a portion of the digital map 78 within a viewport 74 to a user at a block 104. At a block 106, the mapping module 56 receives a geographic search term 86 as the geographic search term 86 is being input via a user interface 34. The mapping module 56 provides suggested geographic terms 88 to the user, and in response to receiving an identified suggested geographic term 90, the mapping module 56 determines if the identified geographic term 90 identifies or is associated with an off-screen entity located outside the retrieved or selected geographic area (e.g. the viewport 74) at a block 108. At a block 110, the mapping module 56 generates and provides an off-screen content indicator 92 that indicates the direction toward the location of off-screen entity and that is preferably placed outside the viewport 74. In response to placing the off-screen indicator 92 outside the viewport 74, the mapping module 56 temporarily moves or shifts the viewport 74 in a general direction toward the location of the identified off-screen entity to reveal the off-screen indicator 92 at a block 112 and then moves the viewport 74 back.

Figure 6:
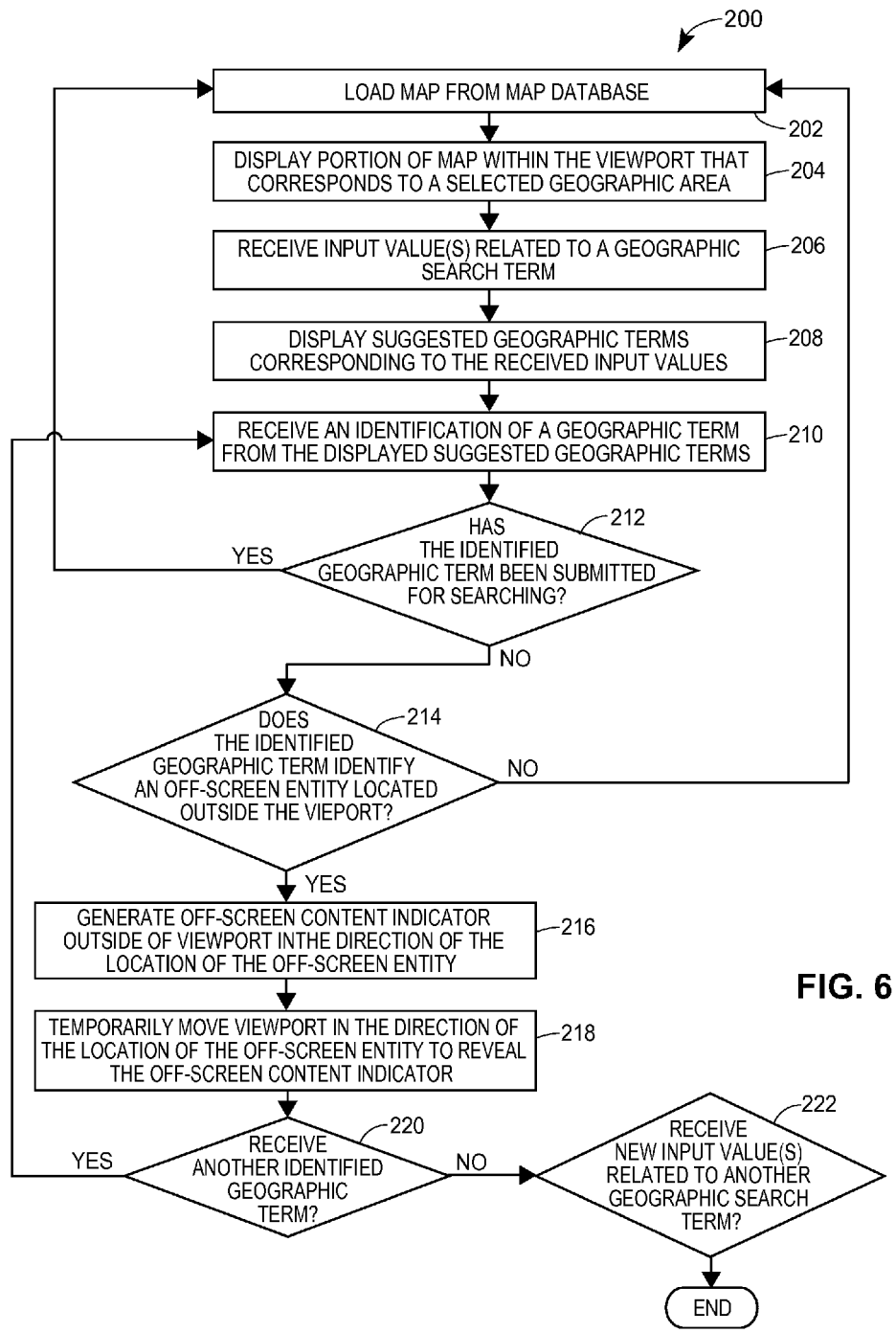
FIG. 6 illustrates an exemplary method of implementing an off-screen content indication system.

FIG. 6 illustrates a routine or a process flow diagram 200 that may be implemented by the mapping module 56 of FIG. 1 to provide an indication of the direction toward an off-screen entity while not occluding a currently displayed map.

Generally, the mapping module 56 receives an identification of a geographic term 90, generates an off-screen content indicator 92 that indicates the location of an off-screen entity associated with the identified geographic term 90, places the off-screen content indicator 92 outside a viewport 74 that currently displays a portion of a map 70 to a user, and temporarily moves or shifts the viewport 74 toward the general direction of the location of the off-screen entity to reveal the generated off-screen content indicator 92.

In particular, at a block 202, the mapping module 56 retrieves map data associated with a user-specified initial geographic area (i.e. the primary map portion 78 displayed within the viewport 74) from the map database 12 via the network 25, or alternatively, the server 14 may transmit map data to the map client device 20 so that the mapping module 56 may use the map data to load or generate a map 70. The mapping module 56 may utilize any suitable method in determining an initial geographical area for which the mapping application may retrieve map data corresponding to the initial geographical area from the map database 12 and display the retrieved map data to the user via the viewport 74. In determining the initial geographic area, the off-screen content indication system 100 may include entering and submitting a geographical search term from the user, receiving an input, such as a mouse input, touch-screen input, etc. that repositions or changes the magnification of the map from the user, utilizing a current geographic position of the map client device 20-24 via the GPS unit 26 or A-GPS, or any other suitable steps or actions in determining the initial geographic area. In using this user-specified initial geographic area, the mapping module 56 may request map data associated with the initial geographic area from the map database 12 and, in turn, may store that map data into the data storage 52 of the map client device 20. In addition to retrieving map data that corresponds to the initial geographical area, the mapping module 56 may also retrieve map data that corresponds to a peripheral region or the buffer zone 77 around the geographical area from the map database 12. Thus, the retrieved map data may include map data that will be displayed to the user with the viewport 74 and map data associated with the buffer zone 77 surrounding the viewport 74 but within the outer boundary 72. It is understood that the mapping module 56 may process the retrieved map data to determine the map data that is displayed within the viewport 78 and map data that includes the buffer zone 77.

Using the map data in the data storage 52, the mapping module 56 may display a primary map portion 78 within the viewport 70 that corresponds to the user-selected geographic area at a block 204. At a block 206, the mapping module 56 may receive input values relating to a geographic search term 86 from the user or from any other input, such as from another computer device, from a software routine, etc. For example, the geographic search term 86 may include a city (as shown in FIG. 3), a state, a county, a country, a landmark, a monument, a specific place of business, a transit or rail station, a type of business (e.g., movie theaters, restaurants, dentists, etc.), or any other category or type of entity that is associated with a geographic location. Using the input values relating to the geographic search term 86, the mapping module 56, at a block 208, may retrieve suggested geographic terms 88 from the map database 12, the server 14, the data storage 52 of the map client device 20, or any other suitable location that store geographic terms 88. Moreover, at the block 208, the mapping module 56 may display these retrieved suggested geographic terms 88 that correspond to the received input values 86 in a dropdown field 84 or any other suitable manner for presenting suggested geographic terms 88.

At a block 210, the mapping module 56 may receive an identification of a geographic term 90 from the displayed suggested geographic terms 88 in any number of ways while not selecting the geographic term 90 for submission. For instance, the user may identify the geographic term 90 by causing a hovering event near the location of the displayed geographic term 90 using a mouse, by highlighting the suggested geographic term 90 via receiving a pressing or holding input from a touch screen, or by detecting any suitable activation of a corresponding control. Likewise, the use may identify the geographic term 90 from the list of suggested geographic terms 88 via a holding or a pressing gesture on a touch screen that signifies the identification of geographic term 90 without selecting the geographic term 90 for submission. As a result, at a block 212, the mapping module 56 determines whether the geographic term 90 has been selected for submission or for searching as described above. If the mapping module 56 determines that the geographic term 90 has been submitted for searching, the mapping module 56 transfers control to the block 202 to reload a new map 70 associated with the new geographic area associated with the selected geographic term 90 for submission. Alternatively, if the mapping module 56 at the block 212 determines that the identified geographic term 90 has not been selected for search submission, then the mapping module 56 may transfer control to a block 214.

At the block 214, the mapping module 56 determines whether the identified geographic term 90 identifies an entity (not shown) that is located outside the viewport 74. The mapping module 56 may implement any techniques known to one skilled in the art to determine whether the location of the entity associated with the identified geographic term 90 is outside the viewport 74. If the mapping module 56 determines the location of the entity is within the viewport 74, the mapping module 56 may transfer control back to the block 202 to recenter the viewport 74 on the location of the entity. However, if the mapping module 56 determines the location of the entity is situated outside the viewport 74, the mapping module 56 may additionally determine whether the location of the entity is situated in the buffer zone 77. If the location of the entity is in the buffer zone 77, the mapping module 56 may transfer control back to the block 202 to recenter the viewport 74 on the location of the entity. Alternatively, the mapping module 56 may not recenter the viewport 56 but rather may transfer control to a block 216 in order to generate a location indicator (not shown) that denotes the precise location of the entity within the buffer zone 70.

At the block 216, the mapping module 56 determines a general direction from the currently displayed primary map portion 78 to the determined location of the off-screen entity associated with the identified geographic term 90. Generally, the mapping module 56 may use the geographic coordinates of the currently displayed primary map portion 78 and of the location of the off-screen entity and trigonometric functions to determine a direction from one location to the other location. Additionally, the mapping module 56 may implement any technique known by one skilled in the art to determine a direction from one location to another location on a map, such as invoking a web service or a web application programming interface (API) that communicates the geographic coordinates of the two locations with the server 14 and map database 12 and receives, in response, direction information associated with the two locations, using basic trigonometric functions to determine direction information, etc. After determining the general direction from the displayed primary map portion 78 toward the location of the off-screen entity, the mapping module 56 may generate an off-screen content indicator 92 that may indicate the direction toward the location of the off-screen entity. This off-screen content indicator 92 may include the name of the off-screen entity, such as the city of "Darwin" as shown in FIG. 4, and/or an indication of a direction (e.g. an arrow, etc.) that may point toward the location of the off-screen entity, a user-selectable link or symbol that redirects the user to the location of the off-screen content (such as the location of Darwin), a distance to the location of the off-screen location, a direction compass that points to the location of the off-screen content, page place data that includes information associated with the off-screen content, etc. As illustrated in FIG. 4, the off-screen content indicator 92 may be placed directly in between the currently displayed primary map portion 78 and the location of the off-screen entity; or in other words, the off-screen content indicator 92 may be placed on an imaginary straight line that runs between the two locations. Another implementation of placing the off-screen content indicator 92 may include the mapping module 56 first determining (or the mapping module 56 receiving from another routine) a driving, walking, bicycling, etc. route from the currently displayed primary map portion 78 to the location of the off-screen entity. This route may include roads or paths are not direct or straight lines between the two locations, but rather, routes that include roads or highways. Thus, in this example, the mapping module 56 may place the generated off-screen content indicator 92 along or pointing to a road, a path, etc. that is situated outside the viewport 74 and may also not be located on or near the straight line that run between the two locations. Alternatively, as described above, the mapping module 56 may generate a location indicator (not shown) that denotes the precise location of the entity if the mapping module 56 determines the entity to be situated in the buffer zone 77. Of course, any other manner of placing the off-screen content indicator 92 may be implemented.

In any event, at a block 218, the mapping module 56 may temporarily move, shift, glide, etc. the viewport 74 relative to the map 70 toward the location of the off-screen entity (or to the location of the off-screen content indicator 92) so that the generated off-screen content indicator 92 is revealed to the user. Because the off-screen content indicator 92 is preferably placed just outside the initially positioned viewport 74, the newly displayed different map portion 96 (as shown in FIG. 4) substantially may overlap the initially displayed primary map portion 78 (as shown in FIG. 3). Preferably, the search box 76 does not move relative to the map 70 but does move relative to the viewport 74. This effect gives the appearance to the user that the search box is affixed to the map 70. In moving the viewport 74 to reveal the off-screen content indicator 92, the off-screen content indicator 92 advantageously does not occlude any map features displayed on the initially displayed primary map portion 78. The viewport 74 may be temporarily shifted or moved for any duration of time, however, any time period between 0.5 seconds to 3 seconds is preferable. The time period may be predetermined and fixed, or be dynamic depending on the application or selectable by a user. After this time period elapses, the mapping module 56 may shift the viewport 74 back to its initial position. The mapping module 56 may transfer control to a block 220.

At a block 220, the mapping module 56 may determine if another identification of one of the other suggested geographic terms 88 is received. If the mapping module 56 receives another identification of one of the other suggested geographic terms 88, the mapping module 56 transfers control to the block 210 for further processing. For example, in response to receiving an identification of an additional suggested geographic term from the user, the mapping module 56 may again determine whether the identified geographic term identifies an off-screen entity located outside the viewport 74, and if so, may generate another off-screen content indicator (not shown) and temporarily move or shift the viewport 74 to reveal the newly generated off-screen content indicator associated with the received identification of the additional suggested geographic term. Alternatively, the mapping module 56 may generate a different off-screen content indicator in the buffer zone 77 for each suggested geographic term 88 received in response to the user-entered geographic search term 86 in the search box 76. As a result, the mapping module 56 generates and places multiple off-screen content indicators within the buffer zone 77 so that the off-screen content indicators exist simultaneously. Of course, the mapping module 56 may continue to place the generated off-screen content indicator 92 and any other subsequently generated off-screen content indicators in the buffer zone 77 for any period of time. Preferably, the mapping module 56 may continue to place all generated off-screen content indicators in the buffer zone 77 until the mapping module 56 receives a newly entered geographic search term 86 in the search box 76. Beneficially, the mapping module 56 may continue to place any or all generated off-screen content indicators so that the mapping module 56 may move the viewport 74 to reveal off-screen content indicators more quickly because the mapping module 56 does not need to process steps as described above. Moreover, the mapping module 56 may move viewport 74 in succession from one generated off-screen content indicator to another generated off-screen content indicator without moving the viewport 74 back to its initial position (i.e. the primary map portion 78) depending on the actions of the user.

In any event, if a new identification is not received, the mapping module 56 transfers control to a block 222. At the block 222, the mapping module 56 determines whether any new input values related to a geographic search term 86 have been received or if the current input values related to the geographic search term 86 have been modified. If a new or modified input value related to the geographic search term 86 is received, the mapping module 56 may transfer control to the block 206 for further processing.

Several examples above discussed generating off-screen content indicators after the user enters a portion of a search term but before the user submits the completed search term. However, it will be understood that the off-screen content indication techniques of the present disclosure are not limited to these scenarios. More generally, the system 10 may utilize these techniques whenever it is desirable to indicate content while keeping the viewport 74 in its current position, regardless of whether the user submitted a partial or complete search term. For example, the user may position the viewport 74 over the map portion 78 and enter a search term such as "movie theater." The system 10 may determine that some of the relevant movie theaters are located within the geographic area represented by the map portion 78, while other movie theaters are located outside the geographic area represented by the map portion 78. Accordingly, the system 10 may generate off-screen content indicators for the other movie theaters, place these indicators slightly outside the viewport 74, and temporarily move the viewport 74 to reveal the indicators.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for a system and a process for rendering information on a mobile computing device having a display screen through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method in a map client device having a user interface for providing an indication of off-screen content during a geographic search, the method comprising:
 providing a digital map via the user interface;
 displaying a portion of the digital map corresponding to a selected geographic area within a viewport located in a first position;
 receiving a geographic search term via the user interface as the geographic search term is being input; and
 prior to receiving an indication that the geographic search term has been submitted for searching:
  (i) determining that the geographic search term identifies an off-screen entity located outside the selected geographic area, (ii) providing an off-screen content indicator that indicates the direction toward the location of the identified off-screen entity, and (iii) temporarily moving the viewport in a general direction of the location of the identified off-screen entity from the first position to a second position, wherein the off-screen content indicator is visible only when the viewport is moved to the second position.

2. The method of claim 1, wherein temporarily moving the viewport includes moving the viewport so that the newly displayed portion of the map within the viewport at the second position substantially overlaps the portion of the map visible when the viewport is in the first position.

3. The method of claim 2, wherein providing the off-screen content indicator includes locating the off-screen content indicator on the outside edge of the viewport while located in the first position, so that the small movement of the viewport reveals the off-screen content indicator at the edge of the viewport.

4. The method of claim 1, wherein temporarily moving the viewport further includes moving the viewport back from the second position to the first position.

5. The method of claim 4, wherein temporarily moving the viewport from the first position to the second position and back from the second position to the first position takes a total of between half a second and three seconds.

6. The method of claim 1, wherein receiving the geographic search term includes receiving the geographic search term within a search box.

7. The method of claim 6, wherein the search box is affixed to one position on the digital map so that the search box does move relative to the viewport when the viewport moves from the first position to the second position.

8. The method of claim 6, wherein receiving the geographic search term within the search box includes updating the geographic search term in response to receiving an entry of a new character via the user interface.

9. The method of claim 1, wherein receiving the indication that the geographic search term has been submitted for searching includes detecting when the user activates a corresponding control.

10. The method of claim 1, further comprising:

receiving a second geographic search term via the user interface as the second geographic search term is being input;

determining that the second geographic search term identifies a second off-screen entity located outside the selected geographic area, providing a second off-screen content indicator that indicates the direction toward the location of the second identified off-screen entity; and temporarily moving the viewport in a general direction of the location of the second identified off-screen entity from the second position to a third position, wherein the second off-screen content indicator is visible only when the viewport is moved to the third position.

11. The method of claim 10, wherein determining that the second geographic search term identifies an off-screen entity located outside the selected geographic area, providing the second off-screen content indicator, and temporarily moving the viewport a general direction of the location of the second identified off-screen entity occur prior to receiving an indication that the second geographic search term has been submitted for searching.

12. The method of claim 11, wherein receiving the indication that the second geographic search term has been submitted for searching includes detecting when the user activates a corresponding control.

13. The method of claim 1, wherein temporarily moving the viewport is limited to the extent the map has been loaded into the memory of the map client device.

14. The method of claim 1, wherein providing the off-screen content indicator includes locating the off-screen content indicator at the location of the identified off-screen entity.

15. A non-transitory computer-readable storage medium having stored thereon a set of instructions, executable by a processor, for providing an indication of off-screen content during a geographic search for a map client device having a user interface, the instructions comprising:

(i) instructions for providing a digital map via the user interface;

(ii) instructions for displaying a portion of the digital map corresponding to a selected geographic area within a viewport located in a first position;

(iii) instructions for receiving a geographic search term via the user interface as the geographic search term is being input;

(iv) instructions for determining that the geographic search term identifies an off-screen entity located outside the selected geographic area;

(v) instructions for providing an off-screen content indicator that indicates the direction toward the location of the identified off-screen entity; and (vi) instructions for temporarily moving the viewport in a general direction of the location of the identified off-screen entity from the first position to a second position, wherein the off-screen content indicator is visible only when the viewport is moved to the second position;

wherein the instructions (iv), (v), and (vi) are executed prior to instructions that operate to receive an indication that the geographic search term has been submitted for searching.

16. The computer-readable storage medium of claim 15, wherein the instructions for temporarily moving the viewport include moving the viewport so that the newly displayed portion of the map within the viewport at the second position substantially overlaps the portion of the map visible when the viewport is in the first position.

17. The computer-readable storage medium of claim 16, wherein the instructions for providing the off-screen content indicator include locating the off-screen content indicator on the outside edge of the viewport while located in the original position, so that the small movement of the viewport reveals the off-screen content indicator at the edge of the viewport.

18. The computer-readable storage medium of claim 15, wherein the instructions for temporarily moving the viewport further include moving the viewport back from the second position to the first position.

19. The computer-readable storage medium of claim 18, wherein the instructions for temporarily moving the viewport from the first position to the second position and back from the second position to the first position include temporarily moving the viewport for a total of between half a second and three seconds.

20. The computer-readable storage medium of claim 15, wherein the instructions for receiving the geographic search term include receiving the geographic search term within a search box.

21. The computer-readable storage medium of claim 20, wherein the search box is affixed to one position on the digital map so that the search box moves relative to the viewport when the viewport moves to the second position.

22. The computer-readable storage medium of claim 20, wherein instructions for receiving the geographic search term within the search box include updating the geographic search term in response to receiving an entry of a new character via the user interface.

23. The computer-readable storage medium of claim 15, wherein instructions for receiving the indication that the geographic search term has been submitted for searching include detecting when the user activates a corresponding control.

24. An off-screen content indication system for providing an indication of an off-screen content during a geographic search, the system comprising:
   a map display routine stored on one or more computer memories and that executes on one or more computer processors to provide a digital map via a user interface and to display a portion of the digital map corresponding to a selected geographical area within a viewport located in a first position;
   a geographic search term input routine stored on one or more computer memories and that executes on one or more computer processors to receive a geographic search term via the user interface as the geographic search term is input; and
   an off-screen content indication routine stored on one or more computer memories and that executes on one or more computer processors, (i) to determine that the geographic search term identifies an off-screen entity located outside the selected geographic area, (ii) to provide an off-screen content indicator that indicates the direction toward the location of the identified off-screen entity, and (iii) to temporarily move the viewport in a general direction of the location of the identified off-screen entity from the first position to a second position, prior to receiving an indication that the geographic search term has been submitted for searching, wherein the off-screen content indicator is visible only when the viewport is moved to the second position.

\* \* \* \* \*